United States Patent

[11] 3,578,916

[72] Inventors Pierre M. Lucas
20 rue tariel, Issy-les-moulineaux;
Michel M. Rouzier, 15 Chemin de la
Sabliere, Vauhallan, France
[21] Appl. No. 817,403
[22] Filed Apr. 18, 1969
[45] Patented May 18, 1971
[32] Priority Apr. 19, 1968
[33] France
[31] 148,810

[54] TELEPHONE SWITCHING SYSTEMS
2 Claims, 7 Drawing Figs.

[52] U.S. Cl. .......... 179/18GE
[51] Int. Cl. .......... H04q 3/42
[50] Field of Search .......... 179/18 (GE) (GF)

[56] References Cited
UNITED STATES PATENTS
3,194,891 7/1965 Lucas et al. .......... 179/18(.7YA)

*Primary Examiner*—William C. Cooper
*Assistant Examiner*—William A. Helvestine
*Attorney*—Abraham A. Saffitz

ABSTRACT: Device for detecting in a switching system including crosspoint matrices, those of said matrices which have faulty crosspoints. The switching system comprises crosspoint matrices interlaced with junctor stages whose junctors are inserted in the subscriber's lines connected to the outer matrices and in the intermatrix junction lines. The junctor stages are associated with identification markers capable of applying a pulse to a selected junctor and with identifiers capable of detecting said pulse response signal. When an identification pulse in a first junctor gives rise to more than one pulse response signal in a second junctor, the matrices inserted between said first and second junctors are considered as faulty. They are withdrawn from the switching system when they are freed.

INVENTORS:
Pierre M. LUCAS
and Michel M. ROUZIER
By Abraham A. Soffitz
ATTORNEY

Patented May 18, 1971

3,578,916

7 Sheets-Sheet 2

INVENTORS:
Pierre M. LUCAS
and Michel M. ROUZIER

By Abraham A. Saffitz
ATTORNEY

INVENTORS:
Pierre M. LUCAS
and Michel M. ROUZIER
By Abraham A. Saffitz
ATTORNEY

INVENTORS:
Pierre M. LUCAS
and Michel M. ROUZIER
By Abraham A. Saffitz
ATTORNEY

Patented May 18, 1971 3,578,916

7 Sheets-Sheet 5

INVENTORS:
Pierre M. LUCAS
and Michel M. ROUZIER
By Abraham A. Saffitz
ATTORNEY

Patented May 18, 1971 3,578,916

7 Sheets-Sheet 6

INVENTORS:
Pierre M. LUCAS
and Michel M. ROUZIER
By Abraham A. Saffitz
ATTORNEY

INVENTORS:
Pierre M. LUCAS
and Michel M. ROUZIER
By Abraham A. Saffitz
ATTORNEY

TELEPHONE SWITCHING SYSTEMS

The present invention relates to a telephone switching system employing space division multiplexing and control units, the system being intended to operate under the control of a computer of known type which receives the required data concerning the service condition of a plurality of telephone lines from a scanning device.

Switching systems have been proposed in which connections and disconnections between telephone lines are performed in a switching network under the control of a computer which receives data concerning the service condition of the telephone lines and the state of the crosspoints of the switching network. The switching networks employed in the switching systems in question, may be equipped with crosspoints consisting of reed relays, arranged in matrices. A switching network of this kind is described in U.S. Pat. No. 3,356,973 issued on Dec. 5, 1967 to the second named applicant of the present application and Henri Marnat.

Switching systems of this kind have already been disclosed in U.S. Pat. No. 3,194,891 issued July 13, 1965. In these switching systems of the prior art, there is provided a switching network comprising a plurality of crosspoint matrices having crosspoints connected to incoming lines, outgoing lines and intermatrix junction lines, routing markers associated with said crosspoint matrices for selectively actuating the crosspoints thereof, a plurality of junctor stages having junctors inserted in said incoming, outgoing and junction lines, each junctor comprising means for detecting a current in the line in which it is inserted, means for producing a current in said lines, means for producing a pulse in said lines and means for detecting said pulse, tester means associated with said junctor stages for selectively actuating said junctor current detecting means according to the junctor addresses in said stages, identification marker means associated with said junctor stages for selectively actuating said junctor pulse, producing means according to the junctor addresses in said stages, identifier means respectively associated with said junctor stages for selectively receiving signals from said junctor pulse detecting means and deriving from said signals the address of the junctor detecting such a pulse, means for marking an incoming line and an outgoing line and the junctors inserted therein, means for selecting in the identification marker means junctors whose pulse producing means produce a pulse, which is detected by the overvoltage detecting means of the junctors inserted in said marked incoming and outgoing lines and means for actuating through the routing markers the crosspoints connected to the incoming, outgoing and junction lines on which are inserted the marked and the selected junctors.

In these systems of the prior art, the connection of a route between an originating and a terminating junctor located in the outer junctor stages and defined by parameters as explained in U.S. Pat. No. 3,194,891 is achieved in six stages:

Stages Ø1, Ø2, Ø3: search of the availability of the junctors defining a route of specified originating and terminating junctors;

Stage Ø4: actuation of the connection marker and routing markers respectively associated with the crosspoints matrices and with the junctor stages;

Stage Ø5: checking of the connection so that the junctors which define the route will be found to be unavailable;

Stage Ø6: rest.

The disconnection of a route of which only the originating junctor or the terminating junctor is known is achieved in five stages:

Stage Ø11: identification of the junctor in the central junctor stage by actuating the identification marker of the known end of the route, which defines the first half-route;

Stage Ø12: identification of the junctor in the outer stage by actuating the connection marker, which defines the second half-route;

Stage Ø13: disconnection of the route by the disconnection marker;

Stage Ø14: checking of the disconnection so that the junctors which previously defined the route will be found to be free (this phase is similar to Ø5).

Stage Ø15: rest.

In the present invention, a new stage is inserted into the connection program and two new stages are inserted into the disconnection program. These new stages replace old stages Ø5, Ø6, Ø13, Ø14 and Ø15, and in replacing these, old stage Ø5 becomes new stage Ø6, old stage Ø6 becomes new stage Ø7, old stage Ø13 becomes new stage Ø14, old stage Ø14 becomes new stage Ø15, old stage Ø15 becomes new stage Ø17; and the new stages which are carried out by the present invention are new steps Ø5, Ø13 and Ø16.

The object of creating the new steps is to prepare the isolation, for maintenance purposes, of a matrix whereof a crosspoint was found to be faulty during the checking action of phase Ø5 and to check the instant when the said matrix is wholly freed from the calls in progress. When the matrix is free, it can be brought off duty.

An embodiment of the invention will now be described, by way of example only, with reference to the accompanying drawings, in which FIG. 1 diagrammatically illustrates a crosspoint;

FIG. 2 represents in block diagram form the switching system of the invention;

FIGS. 3*a*, 3*b* and 3*c* are more detailed diagrams of this switching system;

Figure 1:
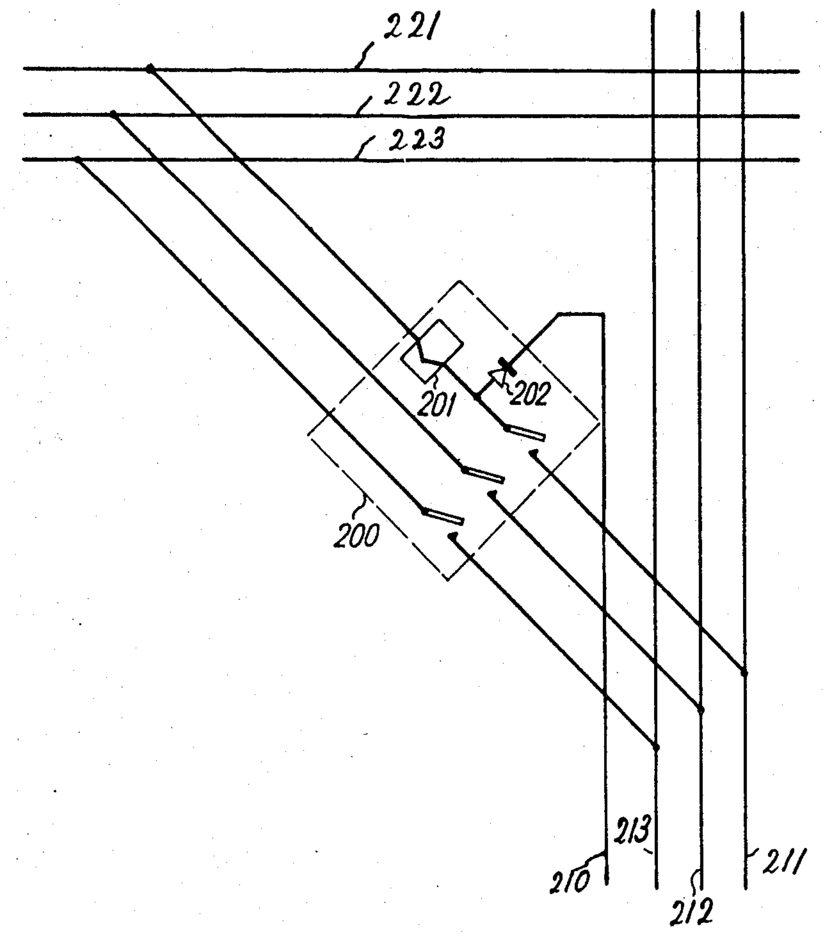

FIG. 1 illustrates a crosspoint 200 of the type of the aforesaid U.S. Pat. No. 3,356,973 between a horizontal row comprising three wires 221, 222, and 223, and a vertical column comprising three wires 211, 212, and 213. The actuation of the crosspoint is effected by applying pulses to the control wire 210 and to the row wire 221 energizing the relay 201 through the diode 202. The relay 201 moves its contacts and a holding current passes from the column (two times) wire 211 to the row wire 221. The row wires 212 and 213, and the row wires 222 and 223 are the conversation wires.

Figure 3A:
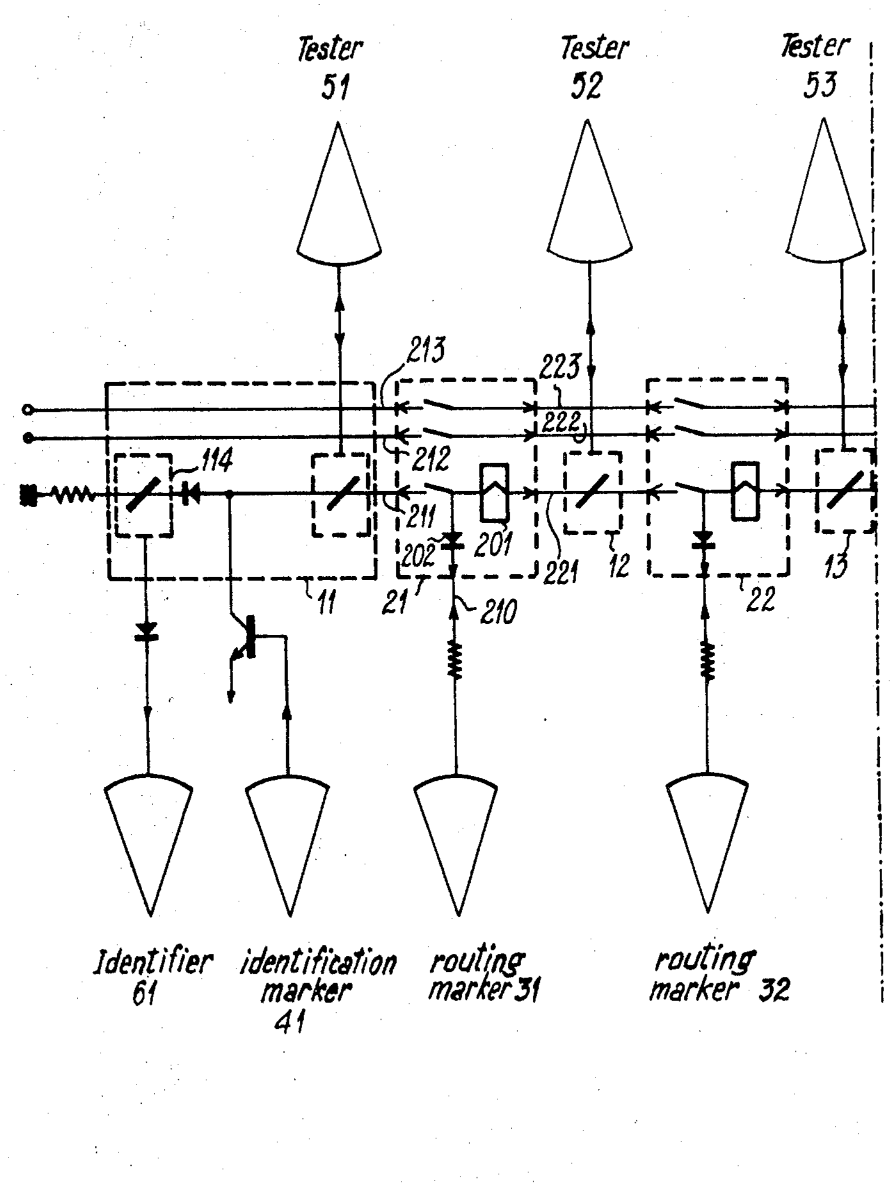
Figure 3B:
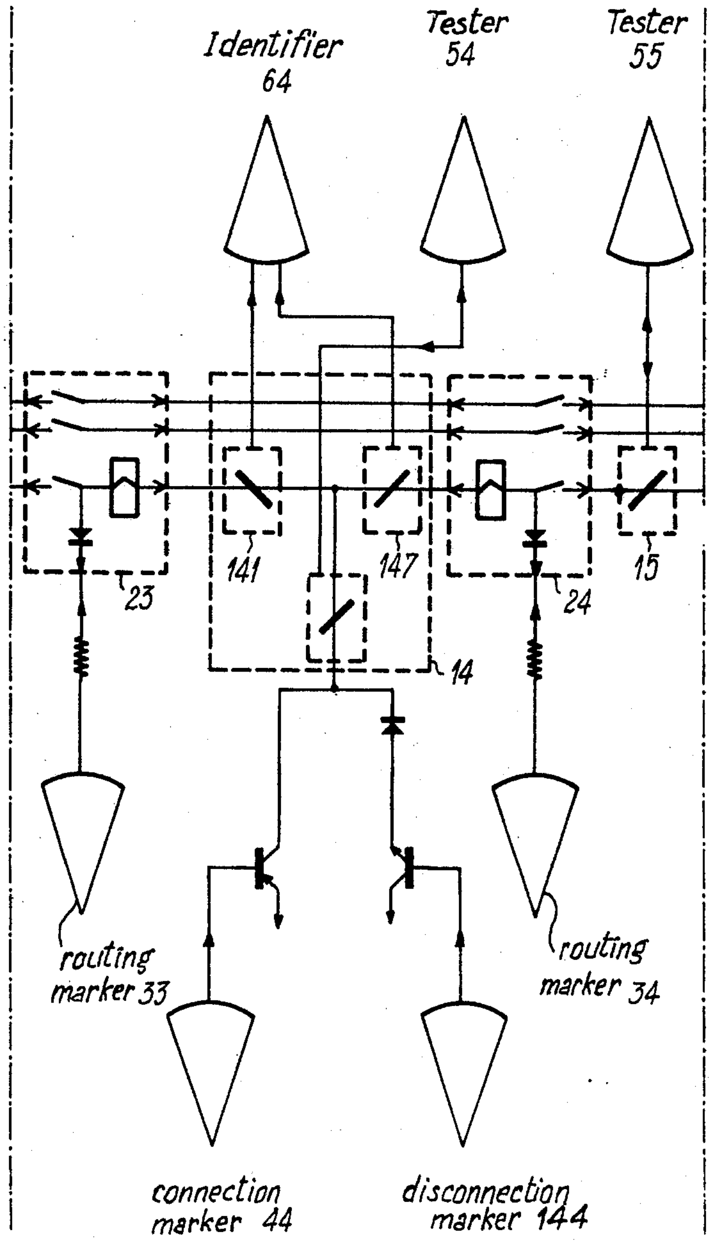
Figure 3C:
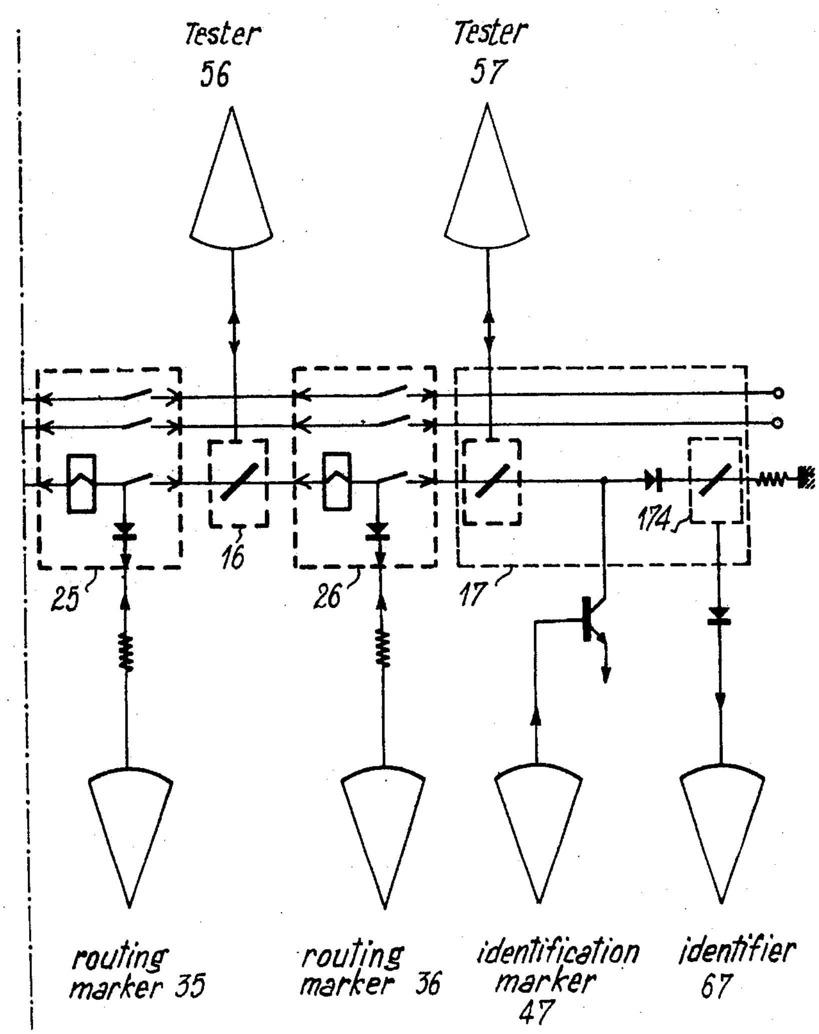

In the illustration of FIGS. 3*a*, 3*b* and 3*c*, the switching stages 21 to 26 have been illustrated in the form of a crosspoint, since a single incoming line (row) and a single outgoing line (column) have been shown, although it is to be understood that matrices are meant.

Figure 2:
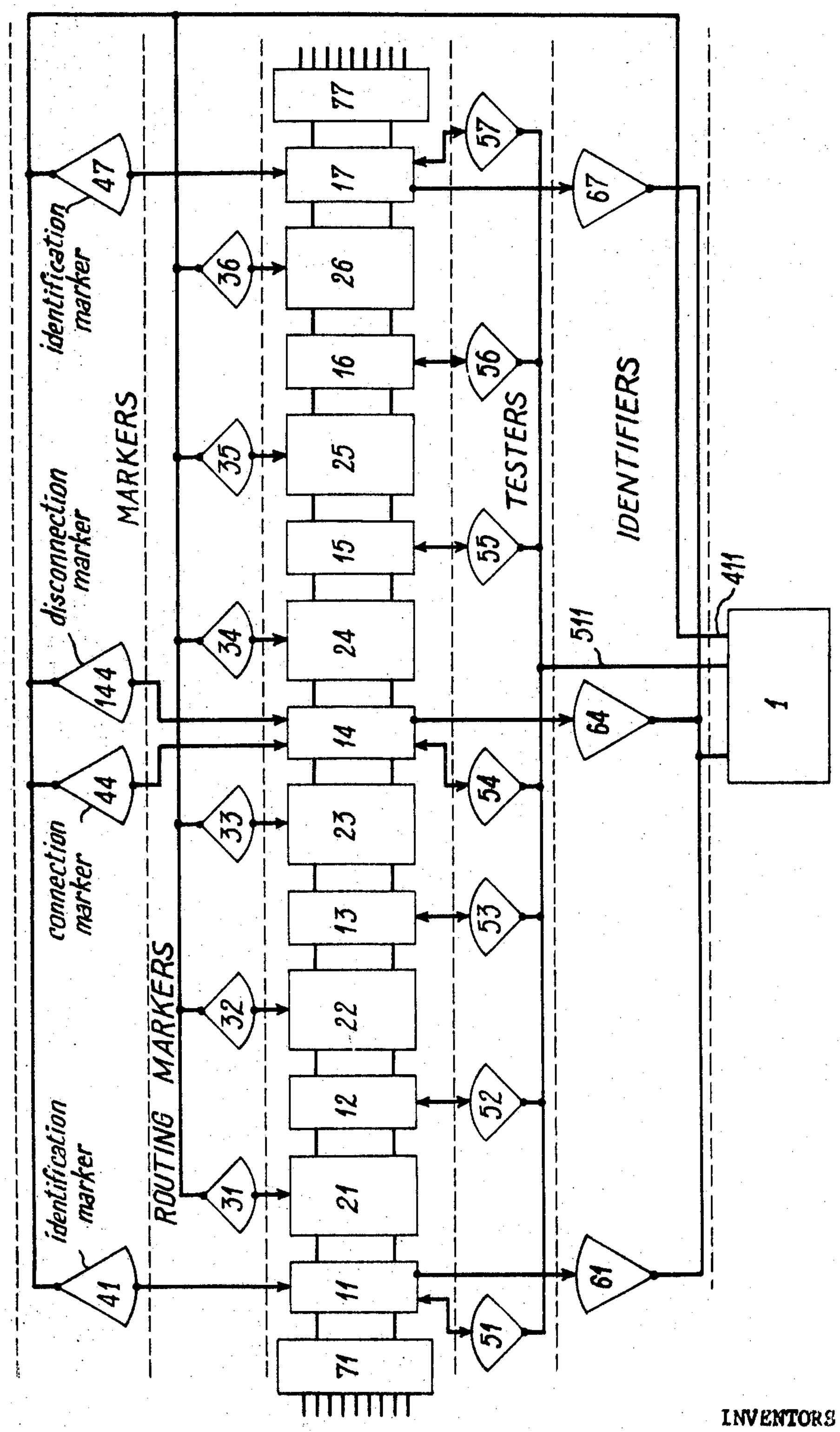

FIG. 2 gives the layout of the arrangement of the switching network, which comprises crosspoints and associated peripheral units. The crosspoints are arranged in matrix switching states 21 to 26. The peripheral units of the switching network which are under the control of a control unit 1, comprise:

- a connection marker 44;
- a disconnection marker 144;
- routing markers 31 to 36;
- identification markers 41 and 47;
- testers 51 to 57, and
- identifiers 61, 64 and 67.

The interconnections between the different switching stages 21 to 26 on the one hand between the outer switching stages 21 and 26 respectively the equipments of incoming lines 71 and the equipments of outgoing lines 77 are made by means of junctor stages 11 to 17, the junctors of stages 11 and 17 being inserted respectively on the incoming and outgoing lines and those of stages 12—16 being inserted on the junction lines between the switching stages of the switching network. The junctor stages equally render it possible to detect the passage of a current on a wire by means of a magnetic core having a rectangular hysteresis cycle comprising a series winding connected to an incoming, outgoing or junction line wire. The different junctor stages 11 to 17 are connected to the testers 51 to 57, respectively. The switching stages 21 to 26 are connected to the routing markers 31 to 36 respectively. The stage 14 of the central junctors is connected to the connection marker 44, to the disconnection marker 144 and to the central identifier 64. The outer junctor stages 11 and 17 are connected to the identification markers 41 and 47 and to the identifiers 61 and 67.

The actuation of the crosspoints occurs symmetrically relative to the junctor stage 14 according to the method described in the aforesaid U.S. Pat. No. 3,356,973. Upon connection, the connection marker 44 and the routing markers 31 to 36 controlling the stages 21 to 26, cause the actuation of the crosspoints. The deactivation of these is controlled by the disconnection marker 144. The identification markers 41 and 47 render it possible to establish selectively a pulse across a junctor of the central junctor stage 14 of a connected semipath. This pulse is obtained by short circuiting a resistance either in the junctor stage 11 or in the junctor stage 17. This pulse is detected by a magnetic core having a rectangular hysteresis cycle, that is either core 141 or 147 situated in junctor stage 14 associated with identifier 64 (FIG. **3*b***). This identifier is of the type described in U.S. Pat. No. 3,194,891 already referred to, and provides the binary address of the junction line conveying the pulse.

In symmetrical manner, the connection marker 44 generates selectively a pulse across a junctor of the extreme junctor stages 11 and 17 of an established path. This pulse is detected in the magnetic cores 114. (FIG. **3*a*) and 174 (FIG. 3*c*) situated in junctor stages 11 and 17 respectively associated with the outer identifiers 61 and 67**. These identifiers give the binary address of the junctor actuated by the pulse in the outer junctor stages.

Figure 4:
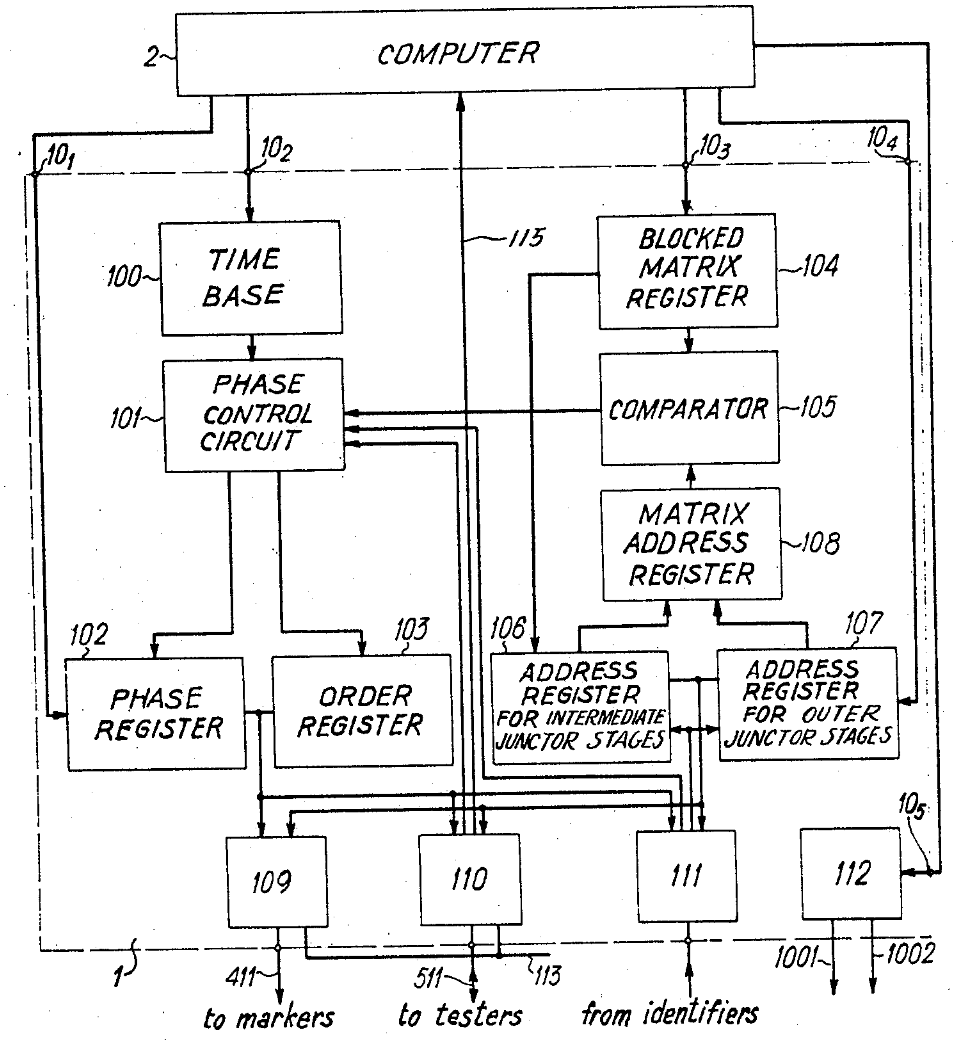
FIG. 4 is a block diagram of the associated control unit.

FIG. 4 shows the general layout of the control unit 1. This control unit 1 receives instructions, in binary form, from a computer 2. These instructions relate to connections, disconnections and changes of chain. An instruction for connection comprises the addresses of the incoming and outgoing lines in the junctor stages 11 and 17 respectively. An instruction for disconnection contains the address of the outgoing line in the junctor stage 17. An instruction of a change of chain includes the addresses of the incoming line, of the connected outgoing line, and of the outgoing line which is to be connected in substitution for the already connected one.

The reference numeral 100 denotes a time base triggered by an actuation signal generated on the wire $\mathbf{10_2}$ by the computer. The time base 100 supplies zero reset pulses, pulses intended for the recording of the data coming from the computer 2 and thereafter trains of pulses intended for transfer of the instructions and of the addresses from the control unit 1 to the peripheral units and vice versa.

Numeral 101 denotes a phase control circuit, which detects the terminations of program phases corresponding either to the result of a test (for example during the search for a path) or to the end of a delaying action (for example during the period of connection). 102 denotes a phase register which registers the number of the stage or subphase actually processed. This phase register essentially comprises flip-flops indicating whether the operation in process is a connection, a disconnection or a change of chain, and a counting register coordinated with a decoder advancing by one step, each time the phase control circuit 101 has ascertained that the stage in process has ended. This register marks the stages ∅1 to ∅7 which will be specified hereinafter. The action of the said register is that of simple counting for the connections and disconnections. As far as the change of chain is concerned, the register 102 interlaces some of the stages of a connecting operation with some of the stages of a disconnecting operation.

Numeral 103 denotes an order register of the counter type, with an associated decoder; it is reset to zero at the end of each stage. It is actuated at each step of a stage and renders it possible to ascertain the number of the order being fulfilled, within the stage, block 107 denotes an address register containing the addresses of the junctor in the outer junctor stages 11 and 17; it is duplicated for the purpose of chain changing operations. 106 denotes an address register containing the addresses of the junctors in the intermediate junctor stages 12 to 16. This register 106 is also duplicated for chain changing purposes. 108 denotes a register for the addresses of matrices which, from either the address register 106 or from the address register 107 derives the address of the matrix at the output side of which is situated the junctor stage to which corresponds the junctor whose address is contained in address register 106 or 107. In fact, a junction line to which a given junctor is connected, comes from a specified matrix and goes to another equally specified matrix. It is thus possible for the register 108 to deduce the address of a matrix from the address of a junctor contained in address register 106 or 107.

Numeral 105 denotes a comparator allowing comparison between the address of a blocked matrix registered in a register of blocked matrices 104 and the address of the matrix employed during the stage in process. As it will be seen in stage ∅16 of the disconnection, when a crosspoint in a given matrix is being disconnected, the address of said given matrix is compared in comparator 105 to the address contained in blocked matrix register 104. If these addresses coincide, that is, if the matrix being processed has been previously found faulty, the special stage ∅16 is initiated. 109 denotes a circuit for connection to the markers, which according to the stage in process, drives address elements from the registers 106 and 107, assembles these and routes them to the appropriate markers. Taking the state of the order register 103 into account, the circuit 109 equally supplies the different pulses required for actuation of the markers. 110 denotes a circuit for connection to the testers which derives address elements from registers 106 and 107 and the test actuation pulses from register 103. The circuit 110 effects the routing of the responses of the testers to the phase control circuit 101. 111 denotes a circuit for connection to the identifiers which derives the identification actuation signals from register 103 and receives the address of the junctor identified in the form of a code "1 out of *n*." This code is transmitted to the address registers of the outer junctors 107 or to the address registers of the intermediate junctors 106 according to the identification in question. The circuit 111 can also compare the address it receives from an identifier to that entered in the registers 106 and 107. If a crosspoint is open, the pulse engendered during an identification, is not propagated and the code received in circuit 111 is a code "0 out of *n*." If a crosspoint adjacent to a connected path is short circuited by said path, the pulse is propagated over two junction lines and the code received is a code "2 out of *n*." The identification linkage circuit 111 ascertains, in each group, whether the code received in a code "1 out of *n*"; if this is not the case, the said circuit 111 indicates a fault.

The operation of the control logical unit 1 will now be set forth in respect of FIG. 4 in the case of a connecting operation, of a disconnecting operation and of a chain changing operation.

CONNECTING OPERATION

A connecting operation comprises the following stages. In each of these stages, the junction lines liable to form a route are tested methodically. The register 106 progresses step by step as a counter, successively offering the addresses of the junctors defining the routes which are possible taking into account the addresses of the outer junctor stages which are entered in the register 107, and the structure of the switching network (the outer junctors being selected, there are, in the intermediate junctor stages, a number of junctors which pass through the possible routes between said outer junctors). At each step, the addresses contained at this instant in register 106 are routed through circuit 110 to the appropriate testers, and the response of these testers is secured due to the actuation signals generated by register 103 and transmitted through circuit 110. If the response of the testers questioned implies that at least one of the junctors (of the intermediate junctor stages 12 to 16) is not available, the progression of the register 106 is actuated and another cycle of tests is started. If the totality of possible routes has been scanned before a favorable test result is obtained, that is to say if the counter 106 has made a complete run through the possible addresses, an internal block occurs and the circuit 106 stores this condition. If, during a cycle of tests, all the testers detect that the intermediate stage junctor whose address they had received, is available, the route can be exploited and the operation passes to the next stage (progression of the register 102).

Stages ∅1, ∅2 and ∅3 of a route search.

The two ends of the route being known (in 11 and in 17) since they depend upon the calling and called subscribers' addresses, a definite number of junctors in central junctor stage 14 correspond thereto. The address of one of the junctors of stage 14 being in the register 106, tester 54 is actuated through circuit 110 (stage ∅1). The test being assumed to be positive, a signal is sent to phase control circuit 101 through circuit 110 and the phase register 102 passes to stage ∅2. The junctors which correspond the specified junctor in stage 11 and to the selected junctor in stage 14, are tested in the stages 12 and 13 by means of the testers 52 and 53. Assuming the test to be positive, a signal is sent to phase control circuit 101 through circuit 110 and the phase register 102 passes to stage ∅ 3. The junctors which correspond to the specified junctor in stage 17 and to the selected junctor in stage 14 are tested in the stages 15 and 16 by means of the testers 55 and 56. The test being assumed to be positive, the route is determined and a signal is sent to phase control circuit 101 through circuit 110 and the phase register 102 passes to stage ∅4 of the route search.

Stage ∅4 for connection and checking of the extremities.

The address of the junctor in stage 11 is situated in register 107, and the addresses of the junctors in stages 12, 13 and 14 are situated in register 106. The connection marker 44 is actuated by register 103 at the address of the junctor selected in stage 14, and the routing markers 31, 32 and 33 are equally actuated by 103 at addresses deduced from those of the junctors selected in 11, 12, 13 and 14. A first semiroute is thus connected.

The address of the junctors, in stage 17 is situated in register 107 and the addresses of the junctors in stages 14, 15 and 16 are situated in register 106. The connection marker 44 is actuated by register 103 at the address of the junctor selected in stage 14 and the routing markers 34, 35 and 36 are equally actuated by register 103 at addresses deduced from those of the junctors selected in 14, 15, 16 and 17. The second semiroute is thus connected.

The connection pulse produced by the connection marker 44 is collected in the identifiers 61 and 67. The circuit 111 receives from identifiers 61 and 67 the address of the junctor actuated in stage 11 and the address of the junctor actuated in stage 17. These two addresses are compared by circuit 111 with the addresses in 107, with the first during the connection of the first semiroute, and with the other during the connection of the second semiroute. If these two comparisons correspond, circuit 111 causes the advance by one step of the phase control circuit 101.

Stage ∅5 for verification of the central connection.

This phase ∅5 is a new phase not provided for in U.S. Pat. No. 3,194,891.

The identification markers 41 and 47 are actuated according to the addresses contained in the address register 107 of the junctors of the outer stages. The identification pulses are collected in the identifier 64 and the address of the junctor actuated in stage 14 is compared with the address in the register 106. This verification occurs successively from stage 11 then from stage 17. If these two comparisons are precise the circuit 111 causes the advance by one step of the phase control circuit 101. As stated above, the signals from an identifier designates the address of the junctor to which the identification markers 41 and 47 or the connection marker 44 have applied a pulse. The address is expressed in a code "1 out of *n*" if a pulse is collected in the identifier, in a code "0 out of *n*" if no pulse is collected in the identifier and in a code "2 out of *n*" if two pulses are collected in the identifier due to a short circuited crosspoint. If the code of the address received by the identifier is not in the "1 out of *n*" code, the number of the matrices through which passes the route are entered into the blocked matrix register 104. But these matrices are not blocked at once but only when they are freed as will be seen in the disclosure of stage ∅16.

Stage ∅6, for checking on the occupation of the different junctors in the stages 11 and 17.

This phase ∅6 is phase ∅5 of the prior art.

The testers are actuated according to the addresses of the junctors of the different stages registered in the registers 106 and 107. All the testers should give the occupied reply. If all the replies denote "occupations" in fact, the circuit 110 causes the advance by one step of the phase control circuit 101, for passage to the inoperative stage ∅7.

DISCONNECTING OPERATION

Stage ∅11 for identification of the central junctor of the route established from stage 17.

The identification marker 47 is actuated at the address of the line to be disconnected, contained in register 107. The address of the central junctor detected by the identifier 64 is transferred into the register 106 through the linking circuit 111.

Stage ∅12 for identification of the outer junctor of the route established from stage 14.

The connection marker 44 is actuated at the address of the central junctor contained in register 106. The address of the outer junctor in stage 11 detected by the identifier 61 is transferred into the register 107 through the linking circuit 111.

Stage ∅13 for checking on the central junctor in stage 14 from stage 11.

The identification marker 41 is actuated at the address of the outer junctor in stage 11 contained in register 107. The address of the central junctor in central stage 14 detected by the identifier 64 is fed into the linking circuit 111 and compared with the address in register 106. If the comparison corresponds, the circuit 111 causes the advance by one step of the phase control circuit 101. As already said, if the address of the central junctor is not in the "1 out of *n*" code, the numbers of the matrices inserted across the half-route are entered into blocked matrix register 104.

Stage ∅14 for disconnection.

A disconnecting pulse is transmitted by the disconnection marker 144 to the address of the junctor of the central stage contained in the register 106.

Stage ∅15 for checking on the nonoccupation of the junction lines.

It was seen that the addresses of the junctors in the stages 12, 13, 15 and 16 were determined when the addresses of the junctors in stages 11, 14 and 17 themselves were determined. The testers 51 to 57 are actuated according to the addresses of the junctors in the different stages 11 to 17 registered in the registers 106 and 107. All the testers should give the nonoccupied reply. If all the replies in fact denote nonoccupation, the circuit 110 causes the advance by one step of the phase control circuit 101.

Stage ∅16 for eventual release of a blocked matrix.

The address of the blocked matrix contained in register 104 is transferred into register 106. It has been seen that the address of a matrix and the addresses of the different junctor lines leading into this matrix were correlated with each other. The tester of the blocked matrix is actuated successively at the addresses of all the incoming junctor lines of this matrix. If all the junctors connected to the matrix by junction lines are free, the circuit 110 receives nonoccupied signals for all the junctors and transmits to the computer 2 via lead 115 an order for blocking in fact the matrix whose blocking was prepared during stage ∅5. Subsequently the phase control circuit 101 passes to the rest stage ∅17.

CHAIN CHANGE OPERATION

The requirement is to disconnect a calling subscriber, that is to say a junctor in stage 11, from a called subscriber or an interoffice trunk, that is to say from a junctor in stage 17, and to connect the same to another junctor in this same stage 17. The stages of this operation are either stages∅1 to∅7 of the connecting operation, or stages∅11 to∅17 of the disconnecting operation, appropriately interlaced. To avoid repetition, the number of each stage in the connecting or disconnecting operations will be quoted.

Stage∅21 for identification of the central junctor of the route established from stage 17.

This is the disconnecting stage∅11.

Stage∅22 for identification of the outer junctor of the route established from stage 14.

This is the disconnecting stage∅12.

Stage∅23 for checking on the central junctor in stage 14 from stage 11.

This is the disconnecting stage∅13.

Stages∅24,∅25 and∅26 of searching for paths between the subscriber and the new junctor in stage 17.

These are the connecting stages∅1,∅2 and∅3.

Stage∅27 for disconnection of the established route.

This is the disconnecting stage∅14.

Stage∅28 for checking on nonoccupation of the junction lines.

This is the disconnecting stage∅5.

Stage∅29 for eventual freeing of a blocked matrix.

This is the disconnecting stage∅16.

Stage∅30 for connecting and checking on the outer junctors.

This is the connecting stage∅4.

Stage∅31 for checking on the central junctor.

This is the connecting stage∅5.

Stage∅32 for checking on the occupation of the different junctors in the stages 11 to 17.

This is the connecting stage∅6.

Inoperative stage∅33.

This is the connecting stage∅7.

Figure 5:
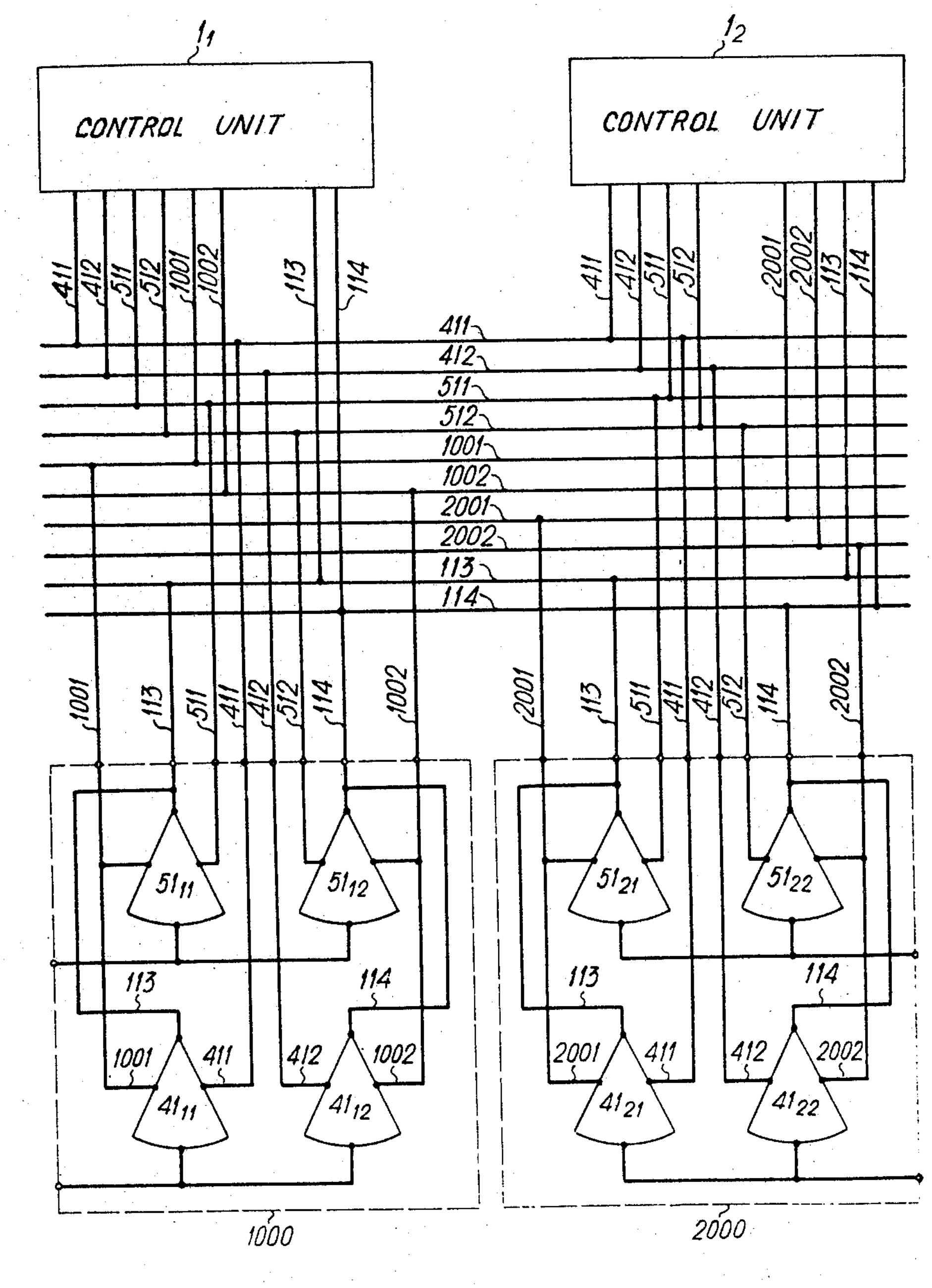
FIG. 5 illustrates an arrangement having duplicated control units and duplicated peripheral units.

The control units and the peripheral units are doubled, for reasons of reliability. The interconnections between the different elements are shown in FIG. 5. The connection between a peripheral unit and a control unit comprises addresses of up to 16 bits and a small number of control signals. The control unit $1_1$, when in operation, sends the addresses of the peripheral units to be actuated, to the transfer bars 113 and 114 and this applies to the control unit $1_2$. Appropriate arrangements are made in the time bases 100 of the control units $1_1$ and $1_2$ such that a single control unit is in operation at a given instant. If a tester, for example tester 51, is taken as an example for a peripheral unit, it is divided into two assemblies each comprising two testers $51_{11}$ and $51_{12}$ for a first switching network frame 1000, and $51_{21}$ and $51_{22}$ for a second switching network frame 2000. One tester in each assembly, $51_{11}$ and $51_{21}$, receives the addresses through the address bar or wire 113, and the other tester in each assembly $51_{12}$ and $51_{22}$ receives the addresses through the address wire 114. The output terminals of the testers $51_{11}$ and $51_{12}$ are multiplied on the connection stage 11 of the first frame and the output terminals of the testers $51_{21}$ and $51_{22}$ are multiplied on the connection stage 11 of the second frame. The control signals of the testers are sent by the control unit in operation, simultaneously to the wires 511 and 512, the first leading to the testers $51_{11}$ and $51_{22}$, and the second to the testers $51_{12}$ and $51_{22}$. The same arrangement is reproduced for the markers, the address wires being the same wires 113 and 114, and the control wires being wires 411 and 412 instead of wires 511 and 512, respectively. FIG. 5 illustrates the identification marker 41 which is divided into two assemblies each comprising two markers $41_{11}$ and $41_{12}$ for the first frame 1000 and $41_{21}$ and $41_{22}$ for the second frame 2000. Numerals 1001 and 1002 denote two wires, both fed by the computer through the terminal $10_5$ and the flip-flop 112 and which activate or deactivate the first set of peripheral units $41_{11}$, and $51_{11}$ etc. of the frame 1000 or the second set of peripheral units $41_{21}$, $41_{22}$ etc. of this frame. Numerals 2001 and 2002 denote two wires performing the same function, respectively, for the frame 2000. Each control circuit should evidently have as many pairs of wires 1001, 1002, 2001, 2002 etc. as there are frames in the switching stage in question.

We claim:

1. In a switching system comprising an originating, a terminating and intermediate crosspoint matrices having crosspoints connected to incoming lines, outgoing lines and intermatrix junction lines, routing markers associated with said crosspoint matrices for selectively actuating the crosspoints thereof and defining routes between a given incoming line and a given outgoing line, a plurality of junctor stages located on both sides of said crosspoint matrices and having junctors inserted in said incoming, outgoing, and junction lines, each junctor having a free and an occupied state and having means for detecting a pulse on the line in which it is inserted, tester means, identification marker means and identifier means respectively associated with the junctors of said junctor stages for respectively testing the states thereof, applying thereto identification pulses and detecting the identification pulse response signal received thereby, a device for detecting matrices having faulty crosspoints and withdrawing the same from the switching system, said device including means for registering the addresses of the matrices inserted in a route between an identification marker means transmitting one identification pulse and an identifier means receiving from said identification marker means more than one identification pulse response signal and means for actuating the tester means associated with the junctors inserted in the junction lines connected to the matrices whose addresses are registered in said registering means, said matrices being withdrawn from the switching system when all the junctors tested by the actuated tester means are in the free state.

2. In a switching system comprising an originating, a terminating and intermediate crosspoint matrices having crosspoints connected to incoming lines, outgoing lines and intermatrix junction lines, routing markers associated with said crosspoint matrices for selectively actuating the crosspoints thereof and defining routes through said matrices between a given incoming line and a given outgoing line, disconnection marker means for controlling disconnection processes in said matrices, a plurality of junctor stages located on both sides of said crosspoint matrices and having junctors inserted in said incoming, outgoing and junction lines, each junctor having free and an occupied state and having means for detecting a pulse on the line in which it is inserted, tester means, identification marker means and identifier means respectively associated with the junctors of said junctor stages for respectively testing the states thereof, applying thereto identification pulses and detecting the identification pulse response signal received thereby, a device for detecting faulty matrices having faulty crosspoints and withdrawing the same from the switching system, said device including means for registering the addresses of the faulty matrices inserted in a route between an identification marker means transmitting one identification pulse and an identifier means receiving from said identification marker means more than one identification pulse response signal, means for comparing the address of a matrix actually engaged in a disconnection process with the address of the faulty matrices registered in said registering means and means for actuating the tester means associated with the junctors inserted in the junction lines connected to a matrix engaged in a disconnection process whose address coincides with the address registered in said registered means, said matrix being withdrawn from the switching system when all the junctors tested by the actuated tester means are in the free state.